United States Patent Office 3,091,630
Patented May 28, 1963

3,091,630
2-(DIMETHYLAMINOETHOXY)ETHYL TRIMETH-OXYBENZOATE AND ITS HYDROCHLORIDE
Martin A. Davis, Montreal, Quebec, Canada, assignor to American Home Products Corporation, New York, N.Y., a corporation of Delaware
No Drawing. Filed July 27, 1961, Ser. No. 127,164
3 Claims. (Cl. 260—473)

This invention relates to certain new chemical compounds, more particularly to a basic alkoxyalkyl trimethoxybenzoate and its salts with pharmaceutically acceptable acids. It is also directed to the method by which these new pharmacologically-active compounds may be prepared from available starting materials.

The new compounds possess antitussive activity and are characterized by very low toxicity. The basic alkoxyalkyl trimethoxybenzoate of my invention may be administered as an antitussive medication in the form of one of its water-soluble salts in solid dosage forms such as tablets or capsules containing an excipient such as, for example, lactose, a disintegrating agent such as, for example, starch, and a lubricant such as, for example, magnesium stearate, or in liquid preparations such as syrups, which may advantageously contain expectorant and secretolytic additives, such dosage forms to contain from 20 to 100 mg. of the active compound per dosage unit.

In base form my new chemical compound, 2-(dimethylaminoethoxy)ethyl 3,4,5-trimethoxybenzoate, has the following structural formula:

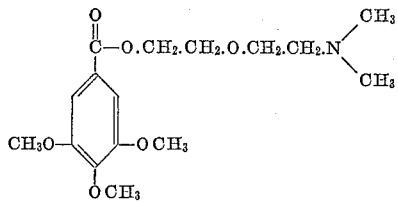

The acid addition salts, especially the hydrohalide salts, may be readily prepared by treatment of the base with an acid.

In preparing the new chemical compound, 2-(dimethylaminoethoxy)ethyl 3,4,5-trimethoxybenzoate, a substituted ethanol, more particularly 2-(dimethylaminoethoxy)ethanol, is reacted with 3,4,5-trimethoxybenzoyl chloride by bringing the two compounds together in an acid-binding solvent, as for example pyridine. While the reaction proceeds at room temperature, it is preferable to heat the reaction mixture on the steam bath. Cooling the reaction mixture, after reaction has been completed, followed by rendering it alkaline by addition of an aqueous alkali, preferably a mild alkali, results in the product, which may then be purified following known techniques.

Addition of an ethereal solution of hydrogen chloride to the base results in the crystalline hydrochloride salt, which can be obtained pure by recrystallization from a suitable solvent or solvent mixture. Isopropanol and acetonitrile are suitable solvents.

The illustrative example which follows gives further details of my method of preparation.

Example

A solution of 2-(dimethylaminoethoxy)ethanol (13.1 g., 0.099 mole) in dry pyridine (5 ml.) was added to a slurry of 3,4,5-trimethoxybenzoyl chloride (22.7 g., 0.099 mole) and pyridine (20 ml.). More pyridine was added from time to time to keep the mixture fluid. It was stirred at room temperature for forty-five minutes and then heated on the steam-bath for forty-five minutes. The reaction mixture was then cooled and added to ice-cold water containing sodium carbonate. A small quantity of insoluble material was discarded and the solution was extracted with ether and benzene to remove the product.

Evaporation of the solvents left an oil which was triturated with cold petroleum ether and then warmed in high vacuum to remove the last traces of pyridine. The red-colored oil (19.2 g., 59% yield) was 2-(dimethylaminoethoxy)ethyl 3,4,5-trimethoxybenzoate, characterized by its ultraviolet adsorption spectrum λ max. 268 mμ, ε 10,100. It was treated with ethereal hydrogen chloride and the solid obtained was recrystallized from isopropanol (or acetonitrile) giving the hydrochloride of 2-(dimethylaminoethoxy)ethyl 3,4,5 - trimethoxybenzoate. The hydrochloride salt was recovered as white needles; M.P. 141–144° C.

Analysis confirmed the empiric formula $C_{16}H_{26}ClNO_6$.
Required: C, 52.81; H, 7.20; N, 3.85; Cl, 9.74%.
Found: C, 52.62; H, 6.98; N, 4.02, 3.91; Cl, 9.58, 9.67%.

I claim:
1. A compound selected from the group which consists of 2-(dimethylaminoethoxy)ethyl 3,4,5-trimethoxybenzoate and its hydrochloride salt.
2. 2 - (dimethylaminoethoxy)ethyl 3,4,5 - trimethoxybenzoate.
3. The hydrochloride salt of 2-(dimethylaminoethoxy)ethyl 3,4,5-trimethoxybenzoate.

References Cited in the file of this patent
UNITED STATES PATENTS
2,816,133   Campbell _____ Dec. 10, 1957
2,928,845   Shapiro et al. _____ Mar. 15, 1960

OTHER REFERENCES
Wagner et al.: Synthetic Organic Chemistry (New York, 1953), pages 481–482.